Figure 1:
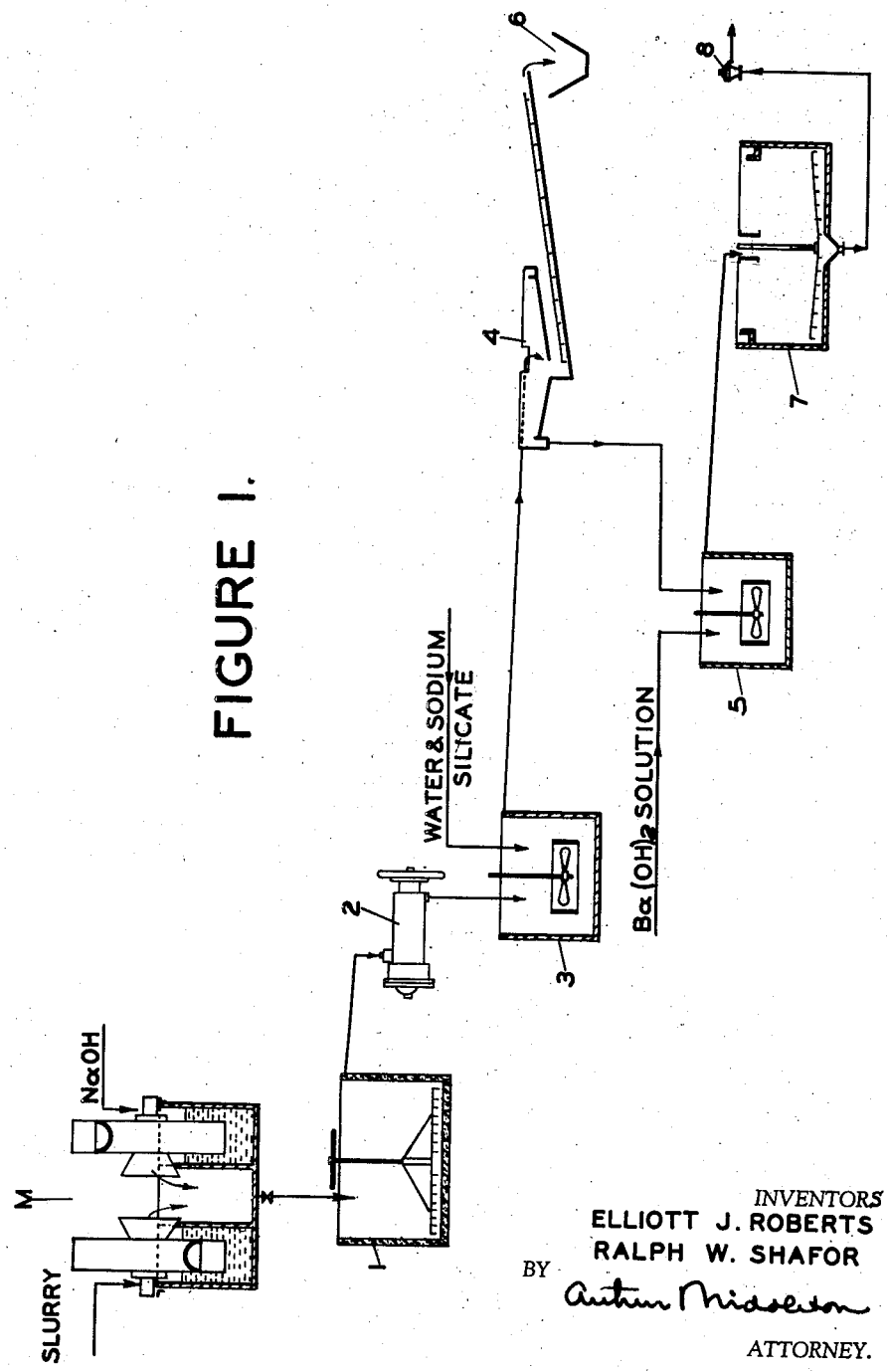

June 6, 1939.  E. J. ROBERTS ET AL  2,161,651

MANUFACTURE OF FINELY DIVIDED PRECIPITATES

Filed Dec. 27, 1934

INVENTORS
ELLIOTT J. ROBERTS
RALPH W. SHAFOR
BY
ATTORNEY.

Patented June 6, 1939

2,161,651

UNITED STATES PATENT OFFICE 2,161,651

MANUFACTURE OF FINELY DIVIDED PRECIPITATES

Elliott J. Roberts, Westport, Conn., and Ralph W. Shafor, New York, N. Y.

Application December 27, 1934, Serial No. 759,374

3 Claims. (Cl. 134—58)

This invention relates to the production of finely divided barium sulfate suitable for use as a pigment or extender to be employed in the manufacture of paints, paper, printing inks, etc. More particularly it pertains to the steps to be taken to secure a product of satisfactory color, state of agglomeration and surface reaction when proceeding according to the method set forth by Work and Allensandroni in United States application for patent, Serial No. 620,974, and by Roberts in United States application for patent, Serial No. 759,375 filed concurrently herewith.

The aforementioned applications deal with the production of finely divided $BaSO_4$ by digesting ground barytes (barite) with a concentrated aqueous solution of sulfuric acid in the form of a thick slurry until the $BaSO_4$ has been transformed into a solid phase product, essentially a compound of $BaSO_4$ and $H_2SO_4$, and subsequently diluting such mixture with water to destroy the compound and reform $BaSO_4$ in a finely divided state.

As a part of this invention it was discovered that in the preparation of precipitated $BaSO_4$ by the above method, the raw material is best calcined before processing unless it is exceptionally pure. Presumably the only thing that happens in the calcination is that organic matter is burned out However it is not certain whether this is the only change which takes place during the calcination process because a carefully washed ore from which the organic matter should have been removed did not give rise to a good color in the finished product while calcined material was satisfactory The same ore, unwashed and uncalcined, gave a less satisfactory product. The organic matter carbonizes in the strong sulfuric acid and the resulting carbon particles cannot be completely removed in the washing steps. Carefully selected barite gives a satisfactory product without calcining but this is not available for commercial operations.

The calcination or roast should be controlled so as to allow access of sufficient air to burn out substantially all of the organic matter while on the other hand the temperature should not be allowed to get high enough to render the iron oxide contaminants insoluble in the $H_2SO_4$. A temperature of not more than about 600° C. is preferred.

Crude barite which has been ground to pass a 150 mesh screen, roasted to remove the organic matter, reacted with 93% sulfuric acid for 72 hours at 50° C., diluted with water or weak liquor to produce a concentration of $H_2SO_4$ of 50%, detained in the 50% sulfuric for 7–24 hours, and the $H_2SO_4$ substantially washed out, gives rise to a brilliant white product entirely free from carbon specks. This product is in itself suitable for some purposes but for others it is not satisfactory. There is present a small percentage of dark grains—not carbon; the $BaSO_4$ particles are tightly agglomerated; there is present a certain percentage of relatively coarse material (larger than 5 microns in diameter) such as quartz, oxides of iron and other minerals including even some undecomposed barite; there is some sulfuric acid present which is so tightly held that ordinary washing methods do not remove it and on drying an apparently neutral filter cake, a decided acidity develops. It has been discovered that all of these objections can be overcome by a few relatively simple operations as described below.

The well washed $BaSO_4$ slurry is settled until the pulp is quite thick—in some cases as dense as it will settle by gravity settlement. This thick slurry is preferably then neutralized to a pH above 5 with a small quantity of NaOH or $Na_2CO_3$. Then the pulp is subjected to high rate of shear such as is obtained in a colloid mill. Although there is no actual grinding, the shearing stresses, if sufficiently intense, disintegrate the agglomerates and free the individual $BaSO_4$ particles from each other. A loose reaggregation or flocculation may take place as soon as the pulp leaves the shear zone but this state of flocculence is easily destroyed by mild agitation in the presence of a dispersing agent.

Addition of the dispersing agent with mild or even quite intense agitation to pulp which has not been subjected to intense shearing action is quite unsatisfactory. Only a small percentage of the material is dispersed and the rest cannot be dispersed no matter how much dispersing agent is added.

Good results are also obtained, however, if the dispersing agent is added before passing the pulp thru the zone of intense shearing. In this case it is advisable but not necessary to make the preliminary neutralization with NaOH or $Na_2CO_3$ since the object of the neutralization is to protect the apparatus used in producing the shearing action.

The reason that this deaggregation step is required for complete dispersion of the product is probably as follows: When the acid sulfate crystals are decomposed by putting them in water or dilute sulfuric acid as

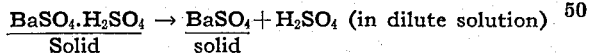
$$BaSO_4.H_2SO_4 \rightarrow BaSO_4 + H_2SO_4 \text{ (in dilute solution)}$$
Solid      solid The $BaSO_4$ particles are precipitated right at the acid sulfate crystal surface and cemented together to a certain extent. This state of agglomeration is sufficiently strong that it is not destroyed by any ordinary mixing or stirring device. A few particles break off but the great majority of the particles are held in the agglomerates. However if the pulp is passed between two plates which are close together and which have a high differential velocity, the shearing stresses which are set up tear the particles apart and cause a deagglomeration to take place. The surfaces do not have to be as close together as the diameter of the particles or even of the aggregates. All that is required is a high differential velocity per unit of distance separating the surfaces. Obviously, the closer the surfaces the greater the shearing stresses for a given differential speed of the surfaces.

It is also possible to deaggregate the material in a ball or rod mill. The movement of the rods or balls results in shearing stresses which are sufficiently intense to deaggregate the material. Of course there is some grinding action in the ordinary mill but this has relatively little effect except on the quartz, undecomposed barite, etc. In fact such grinding is disadvantageous since these impurities cannot be as conveniently separated if they are finely ground. For this reason it is best to use rubber covered rods in a rubber lined mill or some apparatus which will give an equivalent effect.

As stated above, in the absence of dispersing agents, a loose reaggregation may take place which may be distinguished from the original state by calling it flocculation as contrasted to the agglomeration or strong aggregation of the original state. This state of flocculation is easily broken down by very mild agitation in the presence of a dispersing agent which will keep the particles from reflocculating.

After deaggregation and dispersion, the pulp is diluted to a suitable concentration of solids—5 to 10% is quite satisfactory—and classified or hydroseparated in a suitable apparatus. An overflow rate is maintained which will give the desired separation of coarse and fine material. It is preferred to use a rate of 2 ft. per hour or less which at 20° C. will allow only particles smaller than about 15 microns in diameter to go into the fine portion. The coarse portion will contain a certain percentage of fine particles and also may contain some aggregates which have escaped deaggregation. If there is a sufficient amount of recoverable material in this portion it may be passed thru another zone of intense shear and then reclassified after addition of any necessary dispersing agents and proper dilution. In some cases no further deaggregation is required, a reclassification being sufficient to recover most of the valuable material.

As a dispersing agent sodium silicate is preferred. In certain experiments it was found that 40° Bé. silicate of soda to the extent of about 1% by weight of the barium sulfate present gave satisfactory dispersion. Certain other reagents such as ammonium citrate and $Na_3PO_4$ give good to fair results but sodium silicate is by far the best and cheapest reagent found.

The fine portion of overflow must be flocculated before it can be concentrated to a form suitable for handling. A very small quantity of soluble barium salt is efficient in flocculating the suspension. Other type reagents which can be used are sulfuric acid, aluminum sulfate and calcium hydroxide; i. e., reagents which will furnish an active cation. The flocculated suspension settles nicely and the solids ordinarily concentrate to a pulp which carries over 30% solids. This pulp can be further filtered to a cake generally carrying about 70% solids. The overflow from the settling step may be slightly turbid but this solution can be used in washing the barium sulfate free from sulfuric acid so that no loss is entailed at this point.

By the combination of this deaggregating, dispersing, classifying and flocculating, a number of objectives are accomplished. The state of the barium sulfate particles is changed from one of tightly bonded aggregation to one of loose flocculence. This is generally desirable in the use to which the product will be put. Furthermore, such deaggregation is very necessary for proper dispersion and classification. The classification step removes all coarse, gritty particles and also bleaches the product by removing the major part of the dark colored impurities. Thus the product is made smooth and very white. The deaggregation and dispersion in an alkaline media neutralizes occluded and adsorbed acid so that subsequent flocculation with a neutral or alkaline flocculating agent gives a neutral or slightly alkaline product which is also desirable in general. If an acid product is desired for any reason, flocculation with an acid gives the acidity in controlled and definite amount.

It is also found that, where economically and technically practicable, it is advantageous to deaggregate the material before washing out the $H_2SO_4$. Thus the step might precede the first separation or thickening operation, or it might precede the second or third or fourth washing step while in contact with 50%, 20% or 5% $H_2SO_4$ solutions. This allows more opportunity for the dissolution of colored impurities.

In certain cases the classification step may be omitted. Without however omitting the deaggregation step. The precipitate is washed and deaggregated or deaggregated and washed and may then be ready for use or it may be necessary to neutralize the product before use.

For an extra brilliant white product it is sometimes necessary to introduce another step into the series of steps outlined above. This is a reducing step designed to eliminate substantially all the iron from the $BaSO_4$. This is ordinarily most economically done after most of the $H_2SO_4$ and iron compounds have been washed out of the $BaSO_4$, say when there remains ¼% $H_2SO_4$ or less in the liquid carried by the solids. The slurry is diluted to a suitable density for agitation and is ordinarily heated to form 80° C. to the boiling point. A reducing agent such as Titanous sulfate, a sulfide, sulfite, zinc, etc. is added preferably in the presence of an ion such as zinc, magnesium, etc., which will displace the reduced iron ions from the $BaSO_4$ precipitate. It is advantageous if the precipitate has been deaggregated prior to this step.

The precipitate is then put thru the last washing step or steps to remove substantially all the soluble salts and acid present. The steps of deaggregation, dispersion, classification, etc., may then follow; or, if the $BaSO_4$ has already been deaggregated, the step of dispersion would follow directly after the last washing step.

The same general method can be used in the production, in the precipitated state, of $CaSO_4$ or the other alkaline earth sulfate, $SrSO_4$. The ore should be substantially free from organic material and should be substantially anhydrous, i. e., gypsum should not be used unless calcined to remove most of the water. After conversion to the acid sulfate and reprecipitation, the product is washed to a low acid content, neutralized, put thru a colloid mill, dispersed and classified. The overflow is flocculated and settled and the thickened pulp may then be filtered and dried or used in the form of a pulp.

In case it is desired to blend the BaSO₄, CaSO₄ or SrSO₄ with a pigment such as ZnS, TiO₂, etc., this can most conveniently be done directly after the classification step or directly before the classification step, depending on whether or not the pigment has to be classified or not. In case the pigment is already classified or sufficiently fine as to not require classification, the dispersed BaSO₄ as it comes from the classification step is mixed thoroughly with the desired quantity of dispersed pigment pulp and the mixture flocculated with a suitable flocculating agent. If conditions are such that both substances can be classified together, the BaSO₄ pulp after having been thru the colloid mill is mixed with the pigment pulp, dispersing agent added and the mixture classified at a suitable dilution, and then flocculated. In some cases it may even be desirable to put the pigment pulp thru the colloid mill with the BaSO₄ either with or without the addition of a dispersing agent, the dispersing agent then added if it has not already been, classification made and the overflow flocculated.

Fig. 1 illustrates a possible arrangement for carrying out the invention in a continuous manner. Slurry which has been made from calcined ore and washed to a low percentage of H₂SO₄ (preferably 0.04% H₂SO₄ on the BaSO₄ or less) is fed at a controlled rate as by feeders M, into agitator 1, into which also NaOH solution is fed in amount to render the pulp neutral. The discharge from this agitator passes thru colloid mill 2 in which the pulp is deagglomerated. Upon leaving the colloid mill the pulp passes into agitator 3 to which is added water and sodium silicate solution. The discharge from agitator 3 goes into classifier or hydroseparator 4, the smaller particles overflowing to mixer 5 and the larger particles being raked into discharge hopper 6. A barium hydroxide solution is fed into mixer 5 and the discharge from this mixer passes into thickener 7 wherein the pulp settles. Pump 8 draws the thickened pulp from the thickener and discharges it for use or further processing.

We claim:

1. In a process for making precipitated barium sulfate from barite wherein there is formed a solid phase compound resulting from a reaction between sulfuric acid and barite said solid phase compound being essentially a compound of BaSO₄ and H₂SO₄ and suspended in a solution of H₂SO₄, which compound is then decomposed with water with consequent precipitation of barium sulfate, and the dilute sulfuric acid subsequently washed out with water, the steps of taking barite substantially free from organic matter as a raw material; deaggregating the precipitated barium sulfate at some stage of the washing process by subjecting the pulp to a high rate of shear; adding a dispersing agent and a quantity of water to the well washed precipitate and agitating to disperse the fine particles; classifying the material in said dispersed state in order to separate the fine barium sulfate particles from relatively coarse foreign matter and undecomposed barite which would make the product undesirable; flocculating the resulting suspension of fine barium sulfate particles, and separating the flocculated material from a quantity of the water present.

2. In a process for making precipitated barium sulfate from barite wherein there is formed a solid phase compound resulting from a reaction between sulfuric acid and barite said solid phase compound being essentially a compound of BaSO₄ and H₂SO₄ and suspended in a solution of H₂SO₄, which compound is then decomposed with water with consequent precipitation of barium sulfate, and the dilute sulfuric acid subsequently washed out with water, the steps of calcining the barite at a temperature not greater than 600° C. until substantially all of the carbonaceous matter has been removed; passing the precipitate at some stage of the washing process thru a zone of intense shearing action for breaking up agglomerates; adding a dispersing agent and a quantity of water to the well-washed precipitate and agitating to disperse the fine particles; classifying the material in said dispersed state in order to separate the fine barium sulfate particles from relatively coarse foreign matter and undecomposed barite which would make the product undesirable; flocculating the resulting suspension of fine particles; and separating the flocculated material from a quantity of the water present.

3. In a process for making precipitated alkaline earth sulfate from a suitable source of such sulfate wherein there is formed a solid phase compound resulting from a reaction between sulfuric acid and an alkaline earth sulfate said solid phase compound being essentially a compound of alkaline earth sulfate and H₂SO₄ and suspended in a solution of H₂SO₄, which compound is then decomposed with water with consequent precipitation of alkaline earth sulfate, and the dilute sulfuric acid subsequently washed out with water, the steps of taking the alkaline earth sulfate free from organic matter as a raw material; deaggregating the precipitated alkaline earth sulfate at some stage of the washing process by subjecting the pulp to a high rate of shear; adding a dispersing agent and a quantity of water to the well washed precipitate and agitating to disperse the fine particles; classifying the material in said dispersed state in order to separate the fine alkaline earth sulfate particles from relatively coarse material which would make the product undesirable; flocculating the resulting suspension of fine alkaline earth sulfate particles; and separating the flocculated material from a quantity of the water present.

ELLIOTT J. ROBERTS.
RALPH W. SHAFOR.